Patented Sept. 22, 1942

2,296,555

UNITED STATES PATENT OFFICE 2,296,555

PROCESS FOR THE PRODUCTION OF SYNTHETIC POLYAMIDES

Emil Hubert, Dessau-Ziebigk, and Hermann Ludewig, Jessnitz, Anhalt, Germany; vested in the Alien Property Custodian No Drawing. Application May 14, 1940, Serial No. 335,120. In Germany May 30, 1939

6 Claims. (Cl. 260—78)

This invention relates to the production of synthetic polyamides.

It is known that there are obtained high polymeric linear condensation products by heating together equimolecular portions of aliphatic diamines and dicarboxylic acids. Furthermore it has been proposed to employ such compounds as dibasic acids, which contain in the carbon chain a phenylene radical. It is unknown, however, to employ naphthalene dicarboxylic acids.

It is therefore an object of this invention to produce high polymeric polyamides.

Another object is to produce such polyamides by using naphthalene dicarboxylic acids.

These and other objects will appear in the following description.

Surprisingly it has been found that high polymeric artificial materials are obtained, if naphthalene dicarboxylic acids, for instance 1,4-naphthalene dicarboxylic acid or its amid-forming derivatives, are heated together with diamines. According to this invention such diamines carrying on the nitrogen at least one free hydrogen atom are heated under exclusion of atmospheric oxygen with the naphthalene dicarboxylic acids in equimolecular portions. Hereby it is an advantage to start in a known manner with the diammonium salts of the carboxylic acids and the respective amines. The condensation of the diammonium salts takes place surprisingly easy. The temperature preferably applied when heating lies between 120° and 290° C. One may work in the presence or absence of solvents, diluents, catalysts and the like. Atmospheric oxygen has to be eliminated as much as possible during the condensation, which is obtained by working in a nitrogen—or carbon dioxide—atmosphere or by working in a sealed tube.

The simplest way to obtain an atmosphere free from oxygen is by evaporating water in the reaction vessel. The condensation may be accomplished according to the known processes of the preparation of polyamides at excess, normal, or reduced pressure. The salts preferably to be used as starting materials consisting of naphthalene dicarboxylic acids and diamines can be obtained easily in pure form by dissolving the components in methanol and uniting the solutions.

Suitable naphthalene dicarboxylic acids are especially the 1,4-naphthalene dicarboxylic acid and the 1,8-naphthalene dicarboxylic acid. The salt obtained for instance from naphthalene 1,4-dicarboxylic acid with hexamethylenediamine showing a melting point of 245–247° C. may be transformed by heating for several hours into a horn-like, hard, synthetic material of viscous properties, which may be spun into filaments.

Besides the hexamethylene diamine already mentioned also ethylene diamine, tetramethylene diamine, pentamethylene diamine and homologs, if necessary also in mixtures, may be used as α-ω-diamines. Furthermore there are useful for the condensation such diamines, in which a $CH_2$-group of the carbon chain is substituted by sulfur or oxygen, as for instance diamine diethyl sulfide.

The condensation products obtained from naphthalene dicarboxylic acids and diamines or from the diammonium salts of the aforesaid components are of wide application. They may be formed into filaments, foils, sheets, films, ribbons and the like and may be used as coatings, adhesive materials and plastic masses. Especially suitable are condensation products obtained from naphthalene dicarboxylic acid-polymethylene diammonium salts in mixtures with other polyamide-forming compounds. They are elastic, hard and have the advantage, compared with the simple products, to be glass-clear. Also slightly colored products are partly obtained which—especially if impure starting materials are used—can be of yellow, green or yellow-brown color. If equal parts of naphthalene dicarboxylic acid diammonium salts and of a diammonium salt of an aliphatic or araliphatic dicarboxylic acid are employed, in nearly all cases glass-clear, hard products are obtained. If as second component for instance 75 per cent hexamethylene diammonium sebacate is used, artificial materials are obtained, which, when slowly cooled down, are of vitreous, but still opaque appearance. Also if 66 per cent hexamethylene diammonium sebacate is contained in the mixture, the condensate, when slowly cooled down, is not quite completely clear. If 50 per cent, 70 per cent or 80 per cent of the salt obtained from hexamethylene diamine and the naphthalene dicarboxylic acid and of the respective portion of hexamethylene diammonium sebacate is used, glass-clear, hard masses are obtained.

When manufacturing these glass-clear products, not only the diammonium salts of the aliphatic dicarboxylic acids may be used, but also equivalent mixtures of diamines and dicarboxylic acids or their amid-forming derivatives, also amino acids, amino acid esters, amino acid amides or polymerisable lactams of the amino acids, according to U. S. Patent 2,241,321, or urethane carboxylic acids, according to U. S. patent application Ser. No. 277,948, filed June 7, 1939.

Also the mixed condensates can be employed in the same manner as the simple polyamides from naphthalene dicarboxylic acids and diamines, whereby the glass-clear properties of the products are of special advantage for various forms of application. Safety-glass-interlayers for instance may be obtained, as these products are of excellent transparency and adhesiveness.

Example I

A methanolic solution of 216 grams naphthalene 1,4-dicarboxylic acid was united with a methanolic solution of 120 grams hexamethylene diamine. It was cooled with ice and there was obtained a salt of the melting point 245–247° C. 10 grams of this salt were heated with 0.2 gram hexamethylenediamine and 2 cc. water under exclusion of oxygen for always two hours at 200° C., 240° C. and 250° C. and finally for 6 hours at 280° C. The bright-yellow, hard artificial material thus obtained softens above 200° C. and shows a relative viscosity (dissolved as 1 vol. per cent in concentrated $H_2SO_4$) of 1.8. Filaments may be spun from the melt of the artificial material.

Example II

The salt of hexamethylene diamine and naphthalene 1,4-dicarboxylic acid was condensed in different portions in a steam atmosphere with hexamethylene diamine sebacate. In order to replace the evaporating diamine, 1–5 per cent of the total amount of hexamethylene diamine was added in excess to the salt mixture. The times of condensation were from 2–48 hours, the temperatures 240° C., after precondensing for several hours at 200° C. The condensates obtained are white-yellow till dark-yellow colored, hard, elastic and high melting. According to their condensation they are of turbid, opaque, vitreous or water-clear appearance.

| Naphthalene dicarb. hexamethylene diamine | + | Sebacic acid hexamethylene diamine | Appearance |
| --- | --- | --- | --- |
| Per cent | | Per cent | |
| 25 | | 75 | Glassy, turbid. |
| 33⅓ | | 66⅔ | Glassy, opaque. |
| 50 | | 50 | Clear. |
| 66⅔ | | 33⅓ | Clear. |
| 80 | | 20 | Clear. |
| 90 | | 10 | Glassy, opaque. |
| 100 | | ---- | Turbid. |

The relative viscosities (measured in 1 vol. % $H_2SO_4$ concentrated) are between 1.6 and 3. The masses can be spun. A condensate consisting of 10 grams of the salt from naphthalene 1,4-dicarboxylic acid-hexamethylene diammonium and 30 grams sebacic acid-hexamethylene diammonium salt (by adding 0.4 gram diamine and 3 cc. water), obtained by condensing for 4 hours at 200° C. and for 20 hours at 230° C. (viscosity 2.9) could be transformed by spinning directly from the melt into highly valuable filaments and bristles. The products are glass-clear and may be oriented by cold-drawing.

Example III

Naphthalene 1,4-dicarboxylic acid-hexamethylene diammonium salt was heated with hexamethylene diammonium adipate at equal parts by weight and adding 10 per cent water and 2 per cent hexamethylene diamine (calculated at the total amount of the salt employed) for 12 hours at 200° C. and finally always 4 hours at 260 and 280° C. The high viscous product thus obtained solidifies at room-temperature into a glass-clear, hard, elastic, light-yellow colored artificial material, which softens at about 220° C. and shows a relative viscosity (measured in 1 vol. per cent $H_2SO_4$) of 2.6.

Example IV

From equal parts by weight of 9-amino pelargonic acid and naphthalene 1,4-dicarboxylic acid-hexamethylene diammonium salt and adding 5 per cent water and 0.5 per cent hexamethylene diamine (calculated on the total amount) were obtained by condensing 12 hours at 200° C. and finally condensing 12 hours at 240° C. a glass-clear, highly elastic, hard artificial material softening at about 215° C. The artificial material is highly resistant against compressive stress and knocking. The relative viscosity (measured in 1 vol. per cent $H_2SO_4$) is 3.0.

Example V

A salt mixture consisting of 66 per cent naphthalene 1,4-dicarboxylic acid-hexamethylene diammonium salt and 34 per cent of a salt obtained from adipic acid and $\beta\beta'$-diamino diethyl sulfide was condensed in a steam atmosphere for 12 hours at 180° C. and finally for two more hours at 220° C. The solidified melt formed a transparent, vitreous, green colored, hard artificial material softening at 140° C.

Example VI

By condensing for 20 hours at 200° C. of equal parts of $\epsilon$-caprolactam and naphthalene 1,4-dicarboxylic acid-hexamethylene diammonium salt a very viscous melt is obtained, which solidifies at room-temperature into a glass-clear, yellow, hard artificial material softening at 125° C.

Example VII

Equal parts by weight of naphthalene 1,4-dicarboxylic acid-ethylene diammonium salt and hexamethylene diammonium sebacate were condensed by adding 10 per cent water and 2 per cent hexamethylene diamine (calculated on the total amount of salt employed) for two hours at 160° C. and afterwards 24 hours at 200° C. The high viscous melt solidified into a vitreous, transparent, hard product softening at about 145° C., which had a relative viscosity of 1.4 (1 vol. per cent dissolved in concentrated sulfuric acid).

Example VIII

Naphthalene 1,4-dicarboxylic acid-ethylene diammonium salt, melting point 262–265° C., and $\epsilon$-caprolactam were heated, ratio of weight 1:1, in the presence of steam for two hours at 200° C. and for 24 hours at 220° C. After the melt has cooled down a glass-clear, amber-like artificial material was obtained. It softens at 160° C.

What we claim is:

1. A process for preparing highly condensed polyamides which comprises heating at polymerizing temperature a reaction mixture consisting essentially of equimolecular proportions of dicarboxylic acid and diamine, said dicarboxylic acid being in substantial amount a naphthalene dicarboxylic acid and said diamine being an aliphatic $\alpha$-$\omega$-diamine in which the nitrogen atoms carry at least one free hydrogen atom and are separated by a chain of atoms containing at least two carbon atoms.

2. The process set forth in claim 1 in which said dicarboxylic acid and diamine are heated in the form of the diamine-dicarboxylic acid salt.

3. A hard, elastic, glassy highly condensed polymer comprising the reaction product of aliphatic diamine-naphthalene dicarboxylic acid salt and aliphatic diamine-aliphatic dicarboxylic acid salt, the diamines of said salts containing at least one free hydrogen atom on each amino group.

4. A hard, elastic, glass clear highly condensed polymer comprising the reaction product of from 50 to 80% aliphatic diamine-naphthalene dicarboxylic acid salt and from 50 to 20% aliphatic diamine-aliphatic dicarboxylic acid salt, the diamines of said salts containing at least one free hydrogen atom on each amino group.

5. A hard, elastic, glassy highly condensed polymer comprising the reaction product of ε-caprolactam and an alphatic diamine-naphthalene dicarboxylic acid salt in which the diamine contains at least one free hydrogen atom on each amino group.

6. A highly condensed polyamide comprising the reaction product of a reaction mixture consisting essentially of equimolecular proportions of dicarboxylic acid and diamine, said dicarboxylic acid being in substantial amount a naphthalene dicarboxylic acid and said diamine being an aliphatic α-ω-diamine in which the nitrogen atoms carry at least one free hydrogen atom and are separated by a chain of atoms containing at least two carbon atoms.

EMIL HUBERT.
HERMANN LUDEWIG.